(12) United States Patent
Arata (10) Patent No.: US 10,358,062 B2
(45) Date of Patent: Jul. 23, 2019

(54) VEHICLE SEAT (71) Applicant: TACHI-S CO., LTD., Tokyo (JP)

(72) Inventor: Kazuyoshi Arata, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/556,033

(22) PCT Filed: Feb. 9, 2016

(86) PCT No.: PCT/JP2016/053738
§ 371 (c)(1),
(2) Date: Sep. 6, 2017

(87) PCT Pub. No.: WO2016/143448
PCT Pub. Date: Sep. 15, 2016

(65) Prior Publication Data
US 2018/0043807 A1 Feb. 15, 2018

(30) Foreign Application Priority Data
Mar. 6, 2015 (JP) .................. 2015-044562

(51) Int. Cl.
*B60N 2/56* (2006.01)
*A47C 7/74* (2006.01)

(52) U.S. Cl.
CPC ............. *B60N 2/5657* (2013.01); *B60N 2/56* (2013.01); *A47C 7/74* (2013.01); *B60N 2/5621* (2013.01)

(58) Field of Classification Search
CPC ........ B60N 2/56; B60N 2/5621; B60N 2/565; B60N 2/5657; B60N 2/5628; B60N 2/5635; A47C 7/74; A47C 7/742; A47C 7/744

(Continued)

(56) References Cited

U.S. PATENT DOCUMENTS 3,331,089 A * 7/1967 Ornas, Jr. ................ A47C 7/18
297/452.46
5,597,200 A * 1/1997 Gregory .................... A47C 7/74
297/180.13
(Continued)

FOREIGN PATENT DOCUMENTS

JP 3956513 B 6/2000
JP 2002-065397 A 3/2002
(Continued)

OTHER PUBLICATIONS

International Search Report for PCT/JP2016/053738 dated Apr. 26, 2016; English translation submitted herewith (5 pages).
Office Action of JP Appln. No. 2015-044562 dated Oct. 30, 2018.

*Primary Examiner* — Kyle J. Walraed-Sullivan
(74) *Attorney, Agent, or Firm* — Fitch, Even, Tabin & Flannery, LLP (57) ABSTRACT

To make a vehicle seat having functionality for blowing air from the surface of the seat feel comfortable for an occupant to sit on without feeling recesses of opening parts of air-blowing grooves thereon, while ensuring that the efficiency of blowing air to the seat surface is kept high. In the vehicle seat, a urethane pad of a seat cushion and a urethane pad of a seat back have through-holes and groove parts formed thereon, wherein the through-holes are connected to a duct at one end, and the groove parts have openings along a surface covered by a seat cover and are connected to the other ends of the through-holes. Each groove part is formed such that the respective opening has a narrower cross-sectional shape than an internal space of the groove part on the inner side of the urethane pad for the seat cushion/seat back.

15 Claims, 6 Drawing Sheets (58) Field of Classification Search
USPC .................. 297/180.13, 180.14, 452.46
See application file for complete search history.

(56) References Cited

U.S. PATENT DOCUMENTS

| | | | | |
|---|---|---|---|---|
| 5,921,100 A * | 7/1999 | Yoshinori | ........ | B60H 1/00285 165/43 |
| 6,059,018 A * | 5/2000 | Yoshinori | ........ | B60H 1/00285 165/41 |
| 6,179,706 B1 | 1/2001 | Yoshinori et al. | | |
| 7,287,812 B2 * | 10/2007 | Ishima | ........ | B60N 2/5635 297/180.14 |
| 8,777,320 B2 * | 7/2014 | Stoll | ........ | B60H 1/00285 297/452.42 |
| 8,827,372 B2 * | 9/2014 | Yoon | ........ | A47C 7/742 297/180.1 |
| 2003/0102699 A1 * | 6/2003 | Aoki | ........ | B60H 1/00285 297/180.14 |
| 2003/0186642 A1 * | 10/2003 | Aoki | ........ | B60N 2/5635 454/120 |
| 2003/0214160 A1 * | 11/2003 | Brennan | ........ | A47C 7/74 297/180.14 |
| 2004/0164594 A1 * | 8/2004 | Stoewe | ........ | B60N 2/5635 297/180.14 |
| 2005/0233805 A1 | 10/2005 | Okajima | | |
| 2005/0280294 A1 | 12/2005 | Ishima et al. | | |
| 2006/0214480 A1 * | 9/2006 | Terech | ........ | B60N 2/5635 297/180.13 |
| 2006/0232118 A1 * | 10/2006 | Cantrill | ........ | B60N 2/56 297/452.35 |
| 2006/0273646 A1 * | 12/2006 | Comiskey | ........ | A47C 7/74 297/408 |
| 2007/0040421 A1 * | 2/2007 | Zuzga | ........ | B60N 2/5621 297/180.13 |
| 2007/0069554 A1 * | 3/2007 | Comiskey | ........ | B60N 2/5635 297/180.12 |
| 2007/0095378 A1 * | 5/2007 | Ito | ........ | B60N 2/5657 136/203 |
| 2007/0101729 A1 * | 5/2007 | Aoki | ........ | B60H 1/00285 62/3.61 |
| 2007/0234742 A1 * | 10/2007 | Aoki | ........ | B60H 1/00285 62/3.3 |
| 2007/0241592 A1 * | 10/2007 | Griffin | ........ | B60N 2/5635 297/180.1 |
| 2009/0031742 A1 * | 2/2009 | Seo | ........ | B60N 2/5628 62/244 |
| 2009/0079236 A1 * | 3/2009 | Itou | ........ | B60N 2/5635 297/180.1 |
| 2009/0134675 A1 * | 5/2009 | Pfahler | ........ | B60N 2/5635 297/180.1 |
| 2011/0133525 A1 * | 6/2011 | Oota | ........ | B60N 2/5635 297/180.14 |
| 2011/0186560 A1 * | 8/2011 | Kennedy | ........ | B60N 2/5628 219/217 |
| 2012/0006424 A1 * | 1/2012 | Yoon | ........ | A47C 7/742 137/343 |
| 2012/0080911 A1 * | 4/2012 | Brykalski | ........ | A47C 7/744 297/180.15 |
| 2015/0165946 A1 * | 6/2015 | Taguchi | ........ | A47C 31/02 297/452.42 |
| 2015/0329026 A1 * | 11/2015 | Hall | ........ | B60N 2/5614 297/180.1 |
| 2016/0001686 A1 * | 1/2016 | Jung | ........ | B60N 2/5635 297/180.14 |
| 2016/0114709 A1 * | 4/2016 | Kim | ........ | B60N 2/5628 454/120 |
| 2016/0137110 A1 * | 5/2016 | Lofy | ........ | B60N 2/5635 62/3.3 |
| 2016/0207431 A1 * | 7/2016 | Abe | ........ | B60N 2/5621 |
| 2016/0280038 A1 * | 9/2016 | Tanaka | ........ | B60H 1/00285 |
| 2016/0304013 A1 * | 10/2016 | Wolas | ........ | B60N 2/5628 |
| 2016/0325655 A1 * | 11/2016 | Joshi | ........ | B60H 1/00285 |
| 2016/0347217 A1 * | 12/2016 | Nishimura | ........ | B60N 2/5635 |
| 2017/0043694 A1 * | 2/2017 | Tanaka | ........ | B60H 1/00 |
| 2017/0100860 A1 * | 4/2017 | Kumagai | ........ | A47C 27/14 |
| 2017/0181225 A1 * | 6/2017 | Inaba | ........ | B60N 2/565 |
| 2017/0340123 A1 * | 11/2017 | Katsuura | ........ | B60N 2/56 |
| 2018/0093595 A1 * | 4/2018 | Kim | ........ | B60N 2/5621 |

FOREIGN PATENT DOCUMENTS

| | | |
|---|---|---|
| JP | 2005-287532 A | 10/2005 |
| JP | 3853329 B | 10/2005 |
| JP | 2008-273404 A | 11/2008 |
| JP | 2009-077760 A | 4/2009 |
| JP | 2010-052494 A | 3/2010 |
| JP | 2012-224234 A | 11/2012 |

* cited by examiner

VEHICLE SEAT

CROSS-REFERENCE TO RELATED APPLICATIONS

This application is a U.S. national phase application filed under 35 U.S.C. § 371 of International Application No. PCT/JP2016/053738, filed Feb. 9, 2016, designating the United States, which claims priority from Japanese Patent Application No. 2015-044562, filed Mar. 6, 2015, which are hereby incorporated herein by reference in their entirety.

TECHNICAL FIELD

The present invention relates to a vehicle seat, and more particularly, to a vehicle seat having a function of ventilating from a seat surface.

BACKGROUND ART

As a configuration where a seat surface of a vehicle seat is provided with a ventilation function, in the disclosure of Japanese Patent No. 3,835,329 (Patent Literature 1), air sent from an air sending unit is introduced from an introduction passage formed in a main seat material, into an air distribution passage on a groove formed in the surface of the main seat material on the sub seat material side, and the air is exhausted from a through hole formed in the sub seat material to the side of the seat surface material. The opening area of the through hole is set such that it is sequentially enlarged from the introduction passage toward the downstream end side of the air distribution passage.

Further, in the disclosure of Japanese Patent No. 3,956,513 (Patent Literature 2), air forcibly sent from an air sending unit is supplied, from the introduction passage through a communication port, to plural air distribution passages extending along a seat surface. The air distribution passage formed on the seat back side extends approximately linearly on both sides of the seat back in a vertical direction. At least one end of the air distribution passage is open in an end surface of the seat. The communication hole of the introduction passage is provided in a position as a part to receive an occupant's back as seating pressure.

CITATION LIST

Patent Literature

PTL 1: Japanese Patent No. 3,835,329
PTL 2: Japanese Patent No. 3,956,513

SUMMARY OF INVENTION

Technical Problem

In the configuration where the seat surface of the vehicle seat is provided with a ventilation function, it is necessary to attain high ventilation efficiency and sitting comfort.

In the configuration described in the Patent Literature 1, a through hole, having a long-hole shaped opening greater than the width of the air distribution passage, is formed in the sub seat material. To mitigate initial sense of touch upon sitting, a well breathable cover pad is inserted between seat material of the seat part and a skin layer. However, to suppress degradation of sitting comfort, felt by the occupant upon sitting, due to recess of the through hole formed in the sub seat, it is necessary to increase the thickness of the relatively expensive cover pad. This causes cost increase of the vehicle seat.

In the configuration described in Patent Literature 2, an air-conditioning wind, which has flown from an introduction passage recess-formed in a groove shape in the surface of a urethane pad to an air distribution passage, is passed through a sponge layer, and then is blown out from a skin layer. To suppress degradation of sitting comfort felt by the occupant upon sitting, due to recess of the through hole formed in the urethane pad, it is necessary to increase the thickness of the relatively expensive sponge layer. This causes cost increase of the vehicle seat.

The present invention has an object to address the problem in the above-described conventional art, and provide a vehicle seat which has a function of ventilating from a seat surface and provide excellent sitting comfort. In the vehicle seat, this invention makes it possible to maintain high efficiency of air sending to the seat surface, while preventing a seated occupant from feeling the recess of the opening of the air sending groove, without increasing the seat unit price.

Solution to Problem

To address the above problem, the present invention provides a vehicle seat including: a seat cushion that an occupant is seated on; a seat back that the occupant seated on the seat cushion leans against; a blower; and a duct connected to the blower, that sends or exhausts air from the blower to the seat cushion or the seat back. The seat cushion has a urethane pad and a seat cover which covers the surface of the urethane pad. Further, a through hole with one end connected to the duct, and a groove with an opening along a surface covered with the seat cover, connected to the other end of the through hole, are formed in the urethane pad. Further, the groove has a cross-sectional shape where the opening is narrower than a space part inside the groove on the inner side of the urethane pad.

Further, to address the above-described problem, the present invention provides a vehicle seat including: a seat cushion that an occupant is seated on; a seat back that the occupant seated on the seat cushion leans against; a blower; and a duct connected to the blower, that sends or exhausts air from the blower to the seat cushion or the seat back. The seat back has a urethane pad and a seat cover which covers the surface of the urethane pad. Further, a through hole with one end connected to the duct, and a groove with an opening along a surface covered with the seat cover, connected to the other end of the through hole, are formed in the urethane pad. Further, the groove has a cross-sectional shape where the opening is narrower than a space part inside the groove on the inner side of the urethane pad.

Further, to address the above-described problem, the present invention provides a vehicle seat including: a seat cushion that an occupant is seated on; a seat back that the occupant seated on the seat cushion leans against; a blower; and a duct connected to the blower, that sends or exhausts air from the blower to the seat cushion or the seat back. The seat cushion has a urethane pad and a seat cover which covers the surface of the urethane pad. The seat back has a urethane pad and a seat cover which covers the surface of the urethane pad. Further, a through hole with one end connected to the duct, and a groove with an opening along a surface covered with the seat cover, connected to the other end of the through hole, are formed in the urethane pad of the seat cushion and the urethane pad of the seat back. Further, the groove has a cross-sectional shape where the opening is narrower than a space part inside the groove on the inner side of the urethane pad of the seat cushion and the urethane pad of the seat back.

Advantageous Effects of Invention

According to one aspect of the present invention, in the vehicle seat having the function of ventilation from the seat surface, it is possible to provide excellent sitting comfort without increasing the unit price of the seat, by maintaining high efficiency of air sending to the seat surface, while preventing the seated occupant from feeling the recess of the opening of the air sending groove.

DESCRIPTION OF EMBODIMENTS

According to the present invention, a vehicle seat having a ventilation function is provided with urethane pads forming a seat cushion and a seat back. The surface of the urethane pad is covered with a seat cover. In a cross-sectional shape of a ventilation groove formed in the urethane pad, the urethane pad on the both sides of the opening, provided on the side in contact with the seat cover on the groove, has a shape with a thickness sequentially reduced from the outer side. When the occupant is seated and load is applied to the urethane pad, the opening with a small thickness is easily deformed in a direction where the opening-width is narrowed. As a result, even if cushion material is not especially provided between the urethane pad and the seat cover, it is possible to infallibly send air to the seated occupant from a wider area of the seat cover. Accordingly, it is possible to suppress temperature rise in the surface on which the occupant is seated.

Further, as the groove has a structure where the opening is deformed in the direction where the opening-width is narrowed, it is possible to prevent the seated occupant from feeling the recess of the opening.

As the seat cushion and the seat back have this function, it is possible, in a vehicle seat with a ventilation function, to provide excellent sitting comfort.

Hereinbelow, an example of the present invention will be described using the drawings.

EXAMPLE

Figure 1:
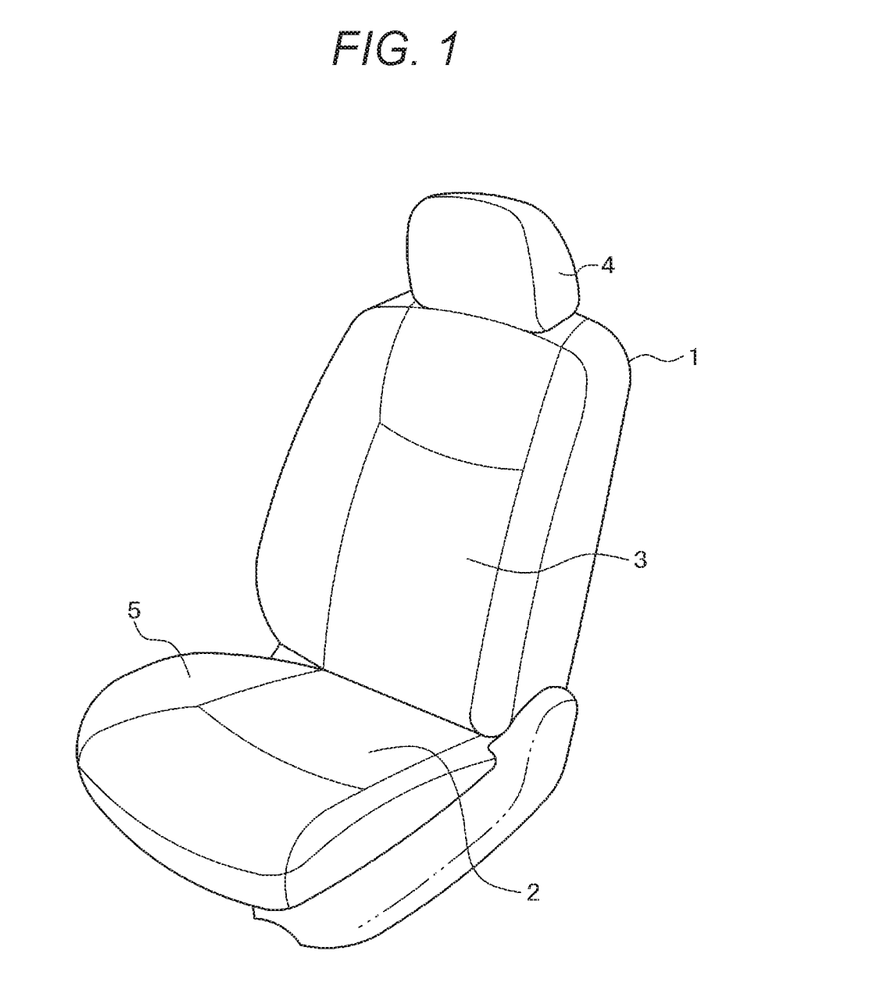
FIG. 1 is a perspective view of a vehicle seat according to an example of the present invention.

FIG. 1 is a perspective view of a vehicle seat 1 according to the present invention. The vehicle seat 1 according to the present invention has a seat cushion 2 on which an occupant is seated, a side support 5 on the both sides of the seat cushion 2, a seat back 3 against which the occupant seated on the seat cushion 2 leans, and a head rest 4 to support the head of the occupant who leans against the seat back 3.

Figure 2A:
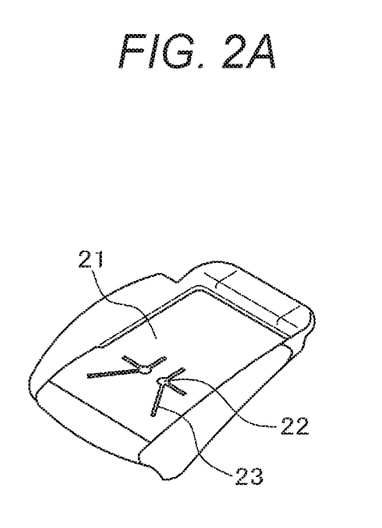
FIG. 2A is a perspective view of a urethane pad of a seat cushion in the vehicle seat according to the example of the present invention.

FIG. 2A is a perspective view of a urethane pad 21 forming the seat cushion 2 in a status before a seat cover formed with a skin layer, cushion material and lining is attached to the surface of the seat cushion 2. In the urethane pad 21, a through hole 22 is formed through to a back surface, and a groove 23 linearly extending from the through hole 22 is formed on the surface side of the urethane pad 21.

Figure 2B:
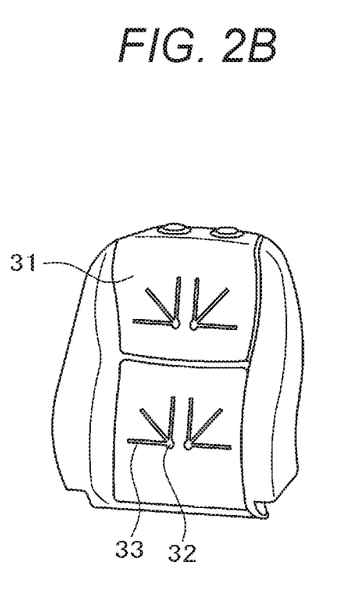
FIG. 2B is a perspective view of the urethane pad of a seat back in the vehicle seat according to the example of the present invention.

FIG. 2B is a perspective view of a urethane pad 31 forming the seat back 3 in a status before the seat cover formed with the skin layer, the cushion material and the lining, is attached to the surface of the seat back 3. In the urethane pad 31, a through hole 32 is formed through to a back surface, and a groove 33 linearly extending from the through hole 32 is formed on the surface side of the urethane pad 31.

Figure 3A:
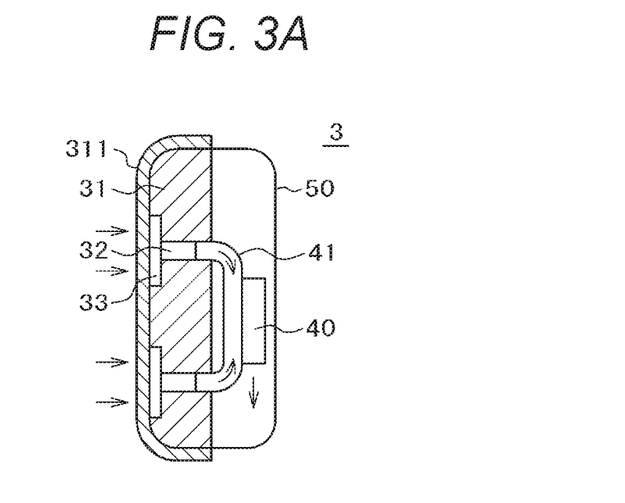
FIG. 3A is a cross-sectional view of the seat back having a configuration where intake is performed from the side of a seat cover in the vehicle seat according to the example of the present invention.

FIG. 3A shows a cross-sectional structure on the side of the seat back 3 having a ventilation function. The seat back 3 has the urethane pad 31, a seat cover 311 which covers the surface of the urethane pad 31, a back cover 50 which covers space of the back surface of the urethane pad 31, a blower 40 provided in the space covered with the back cover 50 on the back surface of the urethane pad 31, and a duct 41 connected to the intake side of the blower 40. As the blower 40, a sirocco fan is used. The both ends of the duct 41 are inserted into the ventilation hole 32 formed in the urethane pad 31. The through hole 32 communicates with the groove 33 formed on the surface of the urethane pad 31 on the side in contact with the seat cover 311. The seat cover 311 is formed with a skin layer, breathable cushion material, and lining. In the skin layer, a large number of minute holes are formed to obtain breathability. The skin layer as a whole has breathability.

Note that the through hole 32 in FIG. 3A corresponds to the through hole 32 of the seat back 3 described in FIG. 2B. The groove 33 in FIG. 3A corresponds to the groove 33 in FIG. 2B.

In the configuration shown in FIG. 3A, the duct 41 is connected to the intake side of the blower 40. In this status, when the blower 40 is operated, the blower 40 sucks air as indicated with an arrow from the surface of the seat cover 311 via the duct 41, the through hole 32 and the groove 33. The air is exhausted to the space covered with the back cover 50 on the back surface of the urethane pad 31.

Figure 3B:
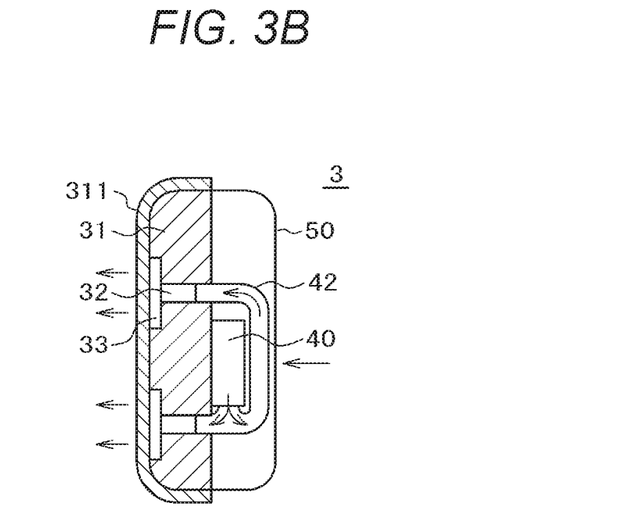
FIG. 3B is a cross-sectional view of the seat back having a configuration where exhaust is performed to the side of the seat cover in the vehicle seat according to the example of the present invention.

FIG. 3B shows another cross-sectional structure of the seat back 3 having the ventilation function. The difference from the configuration described in FIG. 3A is the connection between the blower 40 and the duct 42. That is, in the configuration shown in FIG. 3B, the duct 42 is connected to the exhaust side of the blower 40. The air sucked with the blower 40 from the space covered with the back cover 50 on the back surface of the urethane pad 31 is sent from the duct 42 via the through hole 32 to the groove 33. As indicated with an arrow, the air is exhausted from the surface of the seat cover 311 to the outside.

FIG. 3A and FIG. 3B show the examples of the seat back 3. Regarding the seat cushion 2 side, it is possible to perform air sending or exhausting with respect to the surface of the seat cushion 2 as in the case of the above description by providing the blower 40 described in FIG. 3A and FIG. 3B and the duct 42, or a duct corresponding to the duct 42.

Figure 4:
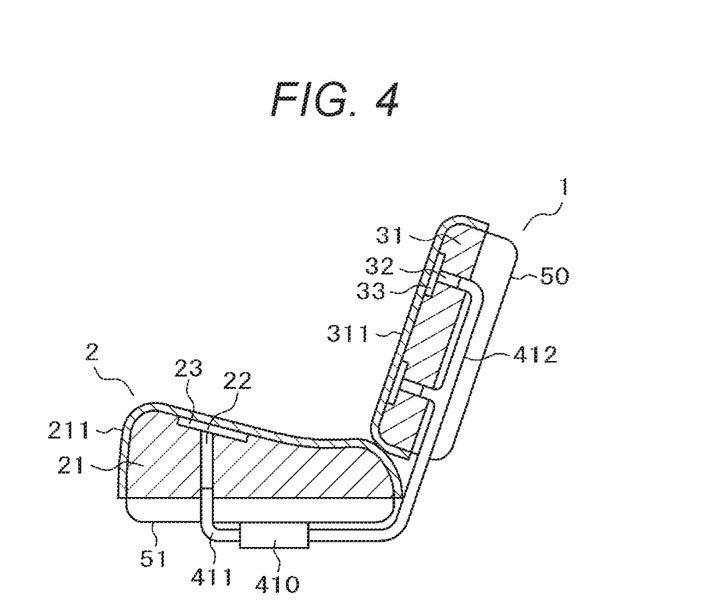
FIG. 4 is a cross-sectional view of the vehicle seat, according to the example of the present invention, having a configuration where intake or exhaust is simultaneously performed from the seat cushion and the seat cover with a blower provided under the seat cushion.

On the other hand, FIG. 4 shows a configuration to perform air sending or exhausting with respect to the seat cushion 2 side and the seat back 3 side by using one blower 10.

In the configuration shown in FIG. 4, a duct 411 connected to the seat cushion 2 and a exhaust duct 412 connected to the seat back 3 side are connected to the exhaust side of a blower 410 provided under the seat cushion 2. The end of the duct 411 is inserted in the through hole 22 formed in the urethane pad 21 of the seat cushion 2. Further, the end of the duct 412 is inserted in the through hole 32 formed in the urethane pad 31 of the seat back 3.

In this configuration, when the blower 410 is operated, the blower 410 sucks air from the outside, and then exhausts the air to the side of the duct 411 and the duct 412. The air exhausted to the duct 411 side is introduced through the through hole 22 to the groove 23 formed in the urethane pad 21. Then the air is exhausted from the groove 23 through the seat cover 211 which covers the surface, to the outside. Further, the air exhausted to the duct 412 side is introduced through the through hole 32 to the groove 33 formed in the urethane pad 31. Then the air is exhausted from the groove 33 through the seat cover 311 which covers the surface, to the outside.

In the configuration shown in FIG. 4, when the ducts 411 and 412 are connected to the intake side of the blower 410, the air is sucked from the side of the seat covers 211 and 311 to the grooves 23 and 33 by operating the blower 410. Then the air is exhausted from the blower 410 through the through holes 22 and 32, and through the ducts 411 and 412, to the outside.

Figure 5A:
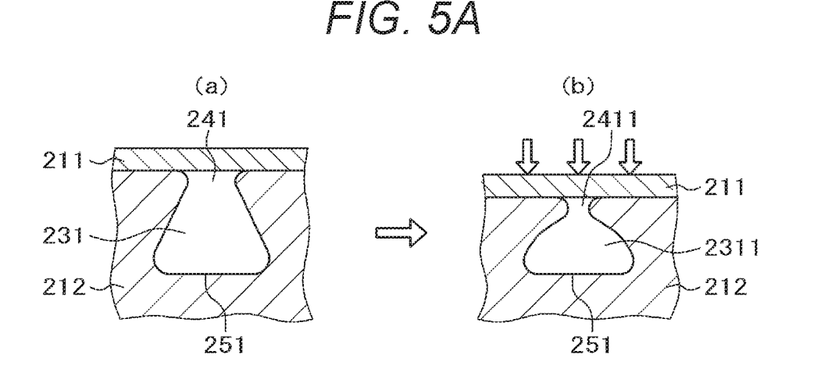
FIG. 5A is a cross-sectional view of a urethane pad of the seat cushion in the vehicle seat according to the example of the present invention, in which a groove having an approximately trapezoidal cross-sectional shape is formed.

Next, FIG. 5A shows a groove 231 as an example of a cross-sectional shape of the groove 23 formed in the urethane pad 21 on the seat cushion 2 side. As the groove 23 formed in the urethane pad 31 of the seat back 3 has the same cross-sectional shape, the cross-sectional shape of the groove 23 formed in the urethane pad 21 on the seat cushion 2 side will be described below.

In FIG. 5A, (a) shows the cross-sectional shape of the groove 231 formed in a urethane pad 212 on the seat cushion 2 side in no-load status. The groove 231 has an approximately trapezoidal shape where a bottom 251 is greater than the upper opening 241. That is, the groove 231 has a cross-sectional shape where the opening 241 is narrower than space inside the groove 231 on the inner side of the urethane pad 212. The surface of the urethane pad 212 is covered with the seat cover 211 formed with the skin layer, the cushion material and the lining.

In this configuration, when the duct 411 is connected to the exhaust side of the blower 410 as described in FIG. 4, the air supplied from the blower 410 via the duct 411 and the through hole 22 to the groove 231 is exhausted from the seat cover 211 through the opening 241 to the outside.

Note that when the occupant is seated on the seat cushion 2, the flexible urethane pad 212 receives load in a direction indicated with an arrow (b) in FIG. 5A, then is compressed and deformed, and a groove 2311 formed in the urethane pad 212 is also deformed. In the cross-sectional shape of the groove 2311 in no-load status, the upper part (opening) 241 is narrower with respect to the bottom 251 as in the case of the groove 231 in (a) in FIG. 5A. When load is received as in the case of (b) in FIG. 5A, at this time, the cross-sectional shape is deformed as of the groove 2311.

That is, on the both sides of the opening 2411, the thickness is sequentially reduced in its cross section. Accordingly, when load is received in the arrow direction in the figure, the opening 2411 is often greatly deformed in a direction where its width is narrowed. As a result, the size of the opening 2411 is narrowed. On the other hand, the size of the bottom 251 of the groove 2311 is almost not changed in comparison with that in the no-load time. As a result, in the groove 2311, even in load-applied status, space to pass the air is ensured. Accordingly, it is possible to supply the air to the end of the groove 2311.

On the other hand, when load is applied to the opening 2411, it is deformed in a direction where the opening size (width) is reduced. It is possible to prevent degradation of sitting comfort for the seated occupant due to the recess by setting the opening size of the opening 241 in no-load time such that when the opening is deformed, it has a size to prevent the seated occupant from feeling the recess with the deformed opening.

Figure 5B:
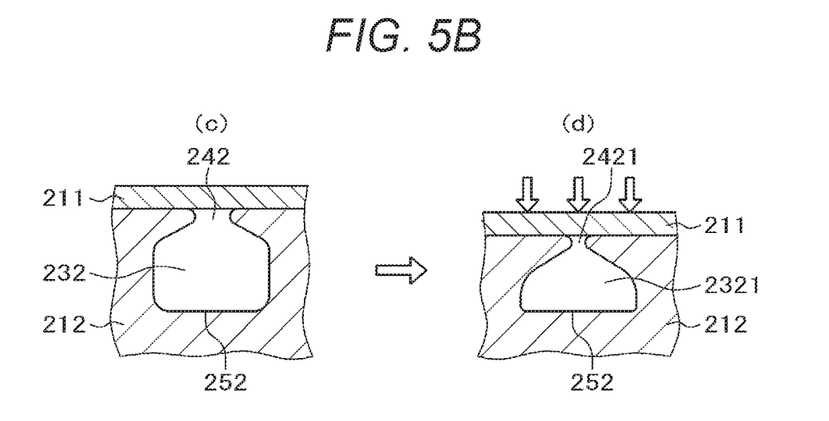
FIG. 5B is a cross-sectional view of the urethane pad of the seat cushion in the vehicle seat according to the example of the present invention, in which a groove having an approximately rectangular cross-sectional shape is formed.

FIG. 5B shows an example where the cross-sectional shape of the groove 232 is changed with respect to FIG. 5A. In the cross-sectional shape of the groove 232, the thickness is sequentially reduced from the both sides in an upper part of rectangular space, and an opening 242 is formed at the center. That is, the groove 232 has a cross-sectional shape where the opening 242 is narrower than the space inside the groove 232 on the inner side of the urethane pad 212. In FIG. 5B, (c) shows the no-load status, and (d), the status where the occupant is seated and load is applied.

Also in the groove 232 shown in (c) in FIG. 5B, when the occupant is seated and load is applied in the arrow direction as shown in (d), the opening 2421 is greatly deformed in a direction where its width is narrowed, while the size of the bottom 252 of the groove 2321 is almost not changed in comparison with the no-load time. As a result, in the groove 2311, even in the load-applied status, space to pass the air is ensured. Accordingly, it is possible to supply the air to the end of the groove 2311.

Further, when load is applied to the opening 2421, it is deformed in the direction where the opening size (width) is reduced. It is possible to prevent degradation of sitting comfort for the seated occupant due to the recess by setting the opening size of the opening 242 in no-load condition such that when the opening is deformed, it has a size to prevent the seated occupant from feeling the recess with the deformed opening.

Figure 5C:
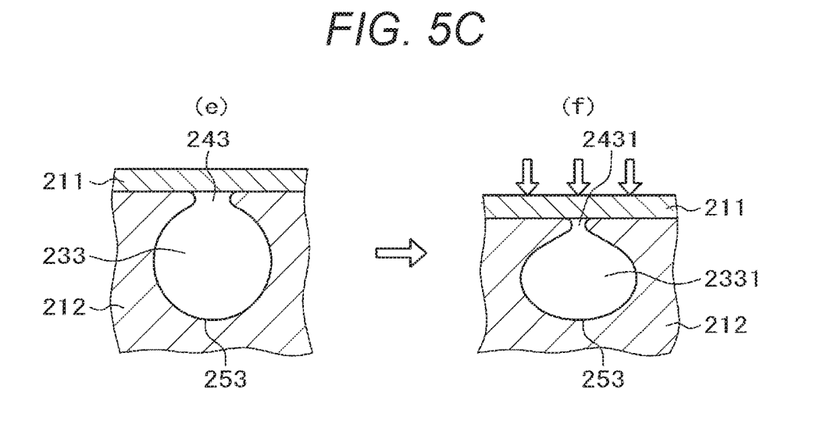
FIG. 5C is a cross-sectional view of the urethane pad of the seat cushion in the vehicle seat according to the example of the present invention, in which a groove having an approximately circular cross-sectional shape is formed.

FIG. 5C shows an example where the cross-sectional shape of the groove 231 is changed with respect to FIG. 5A. In the cross-sectional shape of the groove 233 in FIG. 5C, the thickness is sequentially reduced from the both sides in an upper part of space having a circular cross section, and an opening 243 is formed at the center. That is, the groove 233 has a cross-sectional shape where the opening 243 is narrower than the widest part of the space inside the groove 233 on the inner side of the urethane pad 212. In FIG. 5C, (e) shows the no-load status, and (f), the status where the occupant is seated and load is applied.

Also in the groove 233 shown in (e) in FIG. 5C, when the occupant is seated and load is applied in the arrow direction as shown in (f), the opening 2431 is greatly deformed in a direction where its width is narrowed. On the other hand, a bottom 253 of the groove 2331 is almost not changed in comparison with the no-load time. As a result, in the groove 2311, even in the load-applied status, space to pass the air is ensured. Accordingly, it is possible to supply the air to the end of the groove 2331.

Further, when load is applied to the opening 2431, it is deformed in the direction where the opening size (width) is reduced. It is possible to prevent degradation of sitting comfort for the seated occupant due to the recess by setting the opening size of the opening 243 in no-load condition such that when the opening is deformed, it has a size to prevent the seated occupant from feeling the recess with the deformed opening.

According to the present example, in the cross-sectional shape of the groove 23 formed in the urethane pad 212, the opening provided on the side in contact with the seat cover 211 on the groove 23 has a cross-sectional shape where the thickness is sequentially reduced from the outer side. Accordingly, when the occupant is seated and load is applied to the urethane pad 212, the openings 2411, 2421 and 2431 having small thickness are easily deformed in a direction where the opening width is narrowed. As a result, it is possible to infallibly send air to the seated occupant from a wider area of the seat cover 211 without especially providing cushion material between the urethane pad 212 and the seat cover 211. Accordingly, it is possible to suppress temperature rise in the surface of the seat cushion 2 on which the occupant is seated.

Further, the degree of deformation of the grooves 2311, 2321 and 2331 changes in accordance with load, i.e., the weight of the seated occupant or seating position. In a position where heavy load is applied, the grooves 2311, 2321 and 2331 are greatly deformed and the widths of the openings 2411, 2421 and 2431 are narrowed. In a position where the load is light, the deformation of the grooves 2311, 2321 and 2331 is small and the opening sizes of the openings 2411, 2421 and 2431 are not so much reduced. In accordance with such change, distribution occurs in the amount of air blown out of the openings 2411, 2421 and 2431. In a position where heavy load is applied, the amount of air blown out from the openings 2411, 2421 and 2431 is small. In a position where the load is relatively small, the amount of air blown out from the openings 2411, 2421 and 2431 is large.

In this manner, as the amount of air blown out of the openings 2411, 2421 and 2431 is large in the position where the load is relatively small, it is possible to improve refreshing feeling obtained by the seated occupant and improve the experience.

Further, even in the position where heavy load is applied and the cross section of the groove 2311 is greatly deformed, the space to pass the air is ensured as described above. Accordingly, the air sent from the blower 40 or 410 is supplied to the entire groove 2411 without great resistance. Accordingly, even when an axial flow fan is used in place of the sirocco fan as the blower 40 or 410, it is possible to ensure sufficient air amount over the entire groove 2311.

In contrast, when load is applied to the opening 2411, it is deformed in a direction where the opening size (width) is reduced. It is possible to prevent degradation of sitting comfort for the seated occupant due to the recess by setting the opening size of the opening 241 in no-load time such that when the opening is deformed, it has an opening size to prevent the seated occupant from feeling the recess with the deformed opening.

When this function is also provided on the seat back 3 side, in the seat cushion 2 and the seat back 3 having the ventilation function, it is possible to provide excellent sitting comfort.

In the above-described example, in correspondence with the configuration of the seat back described in FIG. 3B, the example where the air is exhausted from the grooves 2311, 2321 and 2331 to the outside of the seat cover 211 has been described. On the contrary, in correspondence with the configuration of the seat back described in FIG. 3A, it is possible to obtain similar effects in a case where the air is sucked from the seat cover 211 side into the grooves 2311, 2321 and 2331.

Figure 6:
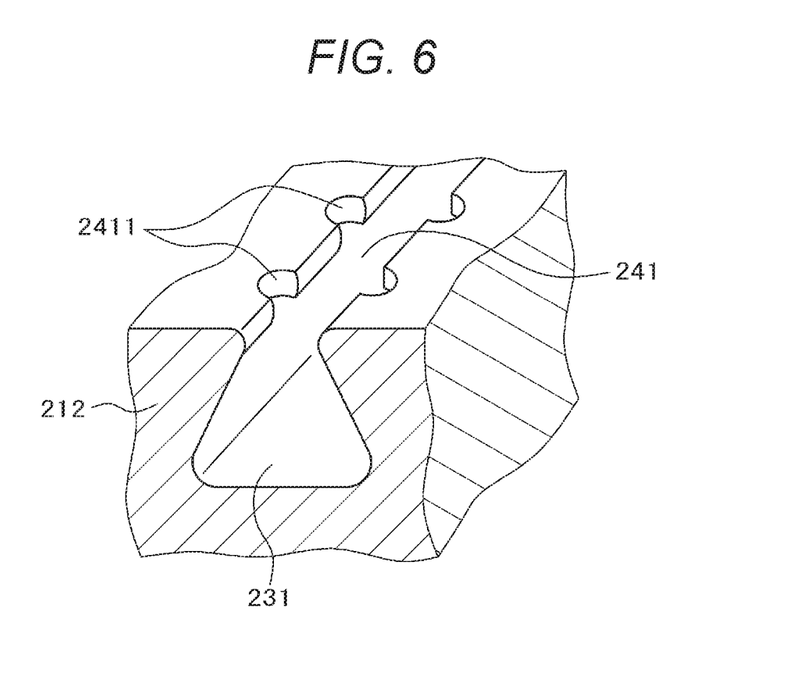
FIG. 6 is a perspective view of the urethane pad of the seat cushion in the vehicle seat according to the example of the present invention, in which a large-opening size part is formed in an opening of the groove formed in the urethane pad along a lengthwise direction of the groove.

FIG. 6 shows a modification of the shape of the groove 231 described in FIG. 5A. FIG. 6 is a perspective view of the urethane pad 212 in which the groove 231 is formed. In the opening 241 of the groove 231, a semi-circular shaped large opening-size part 2411 is discretely formed on the both sides of the opening 241 along the lengthwise direction.

In this manner, by discretely forming the large opening-size part 2411 in the opening 241 of the groove 231, even when a heavy-weighted occupant is seated, the amount of deformation of the urethane pad 212 is large, for example, in (b) in FIG. 5A, even the both sides of the large opening-size part 2411 are closely attached in an upper part of the groove 2311 and the opening size (width) becomes zero, it is possible to exhaust air through the large opening-size part 2411 from the seat cover 211 to the outside, and it is possible to ensure breathability. The shape of the large opening-size part 2411 formed in the opening 241 of the groove 231 is not limited to the semi-circular shape, but may be a triangular shape, a rectangular shape, an elliptical shape or the like. Further, it may be formed not on the right and left sides of the groove but may be formed on only one side or alternately right and left sides.

Figure 7:
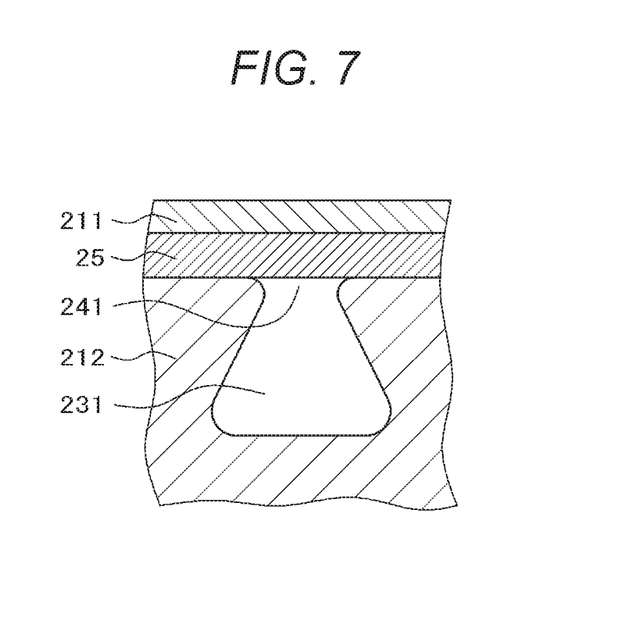
FIG. 7 is a partial cross-sectional view of the seat cushion in the vehicle seat according to the example of the present invention, in which a diffusion layer is formed between the urethane pad of the seat cushion and the seat cover.

FIG. 7 shows a modification of the present example. In the configuration shown in FIG. 7, a layer of breathable flexible material (e.g. urethane foam or sponge) is formed as a diffusion layer 25 on the upper surface of the urethane pad 212 in which the groove 231 is formed, and the seat cover 211 covers the diffusion layer. In the configuration, the urethane pad 212 and the seat cover 211 are connected to each other via the diffusion layer 25. Even when the occupant is seated then the opening 241 of the groove 231 is deformed, and the opening width is narrowed, the air exhausted from the opening 241 is diffused, with the diffusion layer 25, from the opening 241 to the seat cover 211, wider than the width, to arrive at the seat cover 211, and the air is exhausted from the seat cover 211. Accordingly, it is possible to send air with respect to the occupant seated on the seat cushion 2 over a wider area.

As described above, the invention made by the present inventor has been concretely described based on the example. The present invention is not limited to the above example. It goes without saying that various changes may be made without departing from the subject matter.

REFERENCE SIGNS LIST

1 . . . vehicle seat,
2 . . . seat cushion,
3 . . . seat back.
21, 212 . . . seat-cushion side urethane pad,
22 . . . through hole
23, 231, 232, 233 . . . groove,
31 . . . seat-back side urethane pad,
32 . . . through hole,
33 . . . groove,
40, 410 . . . blower,
41, 42, 411, 412 . . . duct,
211, 311 . . . seat cover.

The invention claimed is:

1. A vehicle seat comprising:
a seat cushion, which is configured for an occupant to be seated thereon;
a seat back, which is configured for an occupant seated on the seat cushion to lean against;
a blower; and
a duct connected to the blower, that sends or exhausts air from the blower to the seat cushion or the seat back,
wherein the seat cushion has a urethane pad and a seat cover which covers a surface of the urethane pad,
wherein in the urethane pad, a through hole with one end connected to the duct, and a groove extending in a longitudinal direction with a longitudinally extending opening extending continuously in the longitudinal direction of the groove along a surface covered with the seat cover, connected to another end of the through hole, are formed,
wherein the groove has a cross-sectional shape in a plane perpendicular to the longitudinal direction where the longitudinally extending opening has a width narrower than a space part inside the groove on an inner side of the urethane pad, and
wherein large opening-size parts are provided spaced along the longitudinal direction of the longitudinally extending opening at the surface of the urethane pad covered with the seat cover, the large opening-size parts having a width larger than parts of the longitudinally extending opening not provided with the large opening-size parts.

2. The vehicle seat according to claim 1, wherein the urethane pad on both sides of the longitudinally extending opening of the groove formed in the urethane pad has a cross section where a thickness is sequentially reduced toward the longitudinally extending opening.

3. The vehicle seat according to claim 1, wherein the large-opening size partes comprise semi-circular shaped openings discretely provided along the longitudinal direction of the longitudinally extending opening on both sides of the longitudinally extending opening.

4. The vehicle seat according to claim 1, wherein a diffusion layer formed of breathable flexible material is formed between the urethane pad and the seat cover.

5. The vehicle seat according to claim 1, wherein a plurality of grooves are formed, and the plurality of grooves are respectively linearly formed.

6. A vehicle seat comprising:
a seat cushion, which is configured for an occupant to be seated thereon;
a seat back, which is configured for an occupant seated on the seat cushion to lean against;
a blower; and
a duct connected to the blower, that sends or exhausts air from the blower to the seat cushion or the seat back,
wherein the seat back has a urethane pad and a seat cover which covers a surface of the urethane pad,
wherein in the urethane pad, a through hole with one end connected to the duct, and a groove extending in a longitudinal direction with a longitudinally extending opening extending continuously in the longitudinal direction of the groove along a surface covered with the seat cover, connected to another end of the through hole, are formed,
wherein the groove has a cross-sectional shape in a plane perpendicular to the longitudinal direction where the longitudinally extending opening has a width narrower than a space part inside the groove on an inner side of the urethane pad, and
wherein large opening-size parts are provided spaced along the longitudinal direction of the longitudinally extending opening at the surface of the urethane pad covered with the seat cover, the large opening-size parts having a width larger than parts of the longitudinally extending opening not provided with the large opening-size parts.

7. The vehicle seat according to claim 6, wherein the urethane pad on both sides of the longitudinally extending opening of the groove formed in the urethane pad has a cross section where a thickness is sequentially reduced toward the longitudinally extending opening.

8. The vehicle seat according to claim 6, wherein the large-opening size parts comprise semi-circular shaped openings spaced provided along the longitudinal direction of the longitudinally extending opening on both sides of the longitudinally extending opening.

9. The vehicle seat according to claim 6, wherein a diffusion layer formed of breathable flexible material is formed between the urethane pad and the seat cover.

10. The vehicle seat according to claim 6, wherein a plurality of grooves are formed, and the plurality of grooves are respectively linearly formed.

11. A vehicle seat comprising:
a seat cushion, which is configured for an occupant to be seated thereon;
a seat back, which is configured for an occupant seated on the seat cushion to lean against;
a blower; and
a duct connected to the blower, that sends or exhausts air from the blower to the seat cushion or the seat back,
wherein the seat cushion has a urethane pad and a seat cover which covers a surface of the urethane pad,
wherein the seat back has a urethane pad and a seat cover which covers a surface of the urethane pad,
wherein in the urethane pad of the seat cushion and the urethane pad of the seat back, a through hole with one end connected to the duct, and a groove extending in a longitudinal direction with a longitudinally extending opening extending continuously in the longitudinal direction of the groove along a surface covered with the seat cover, connected to another end of the through hole, are formed,
wherein the groove has a cross-sectional shape in a plane perpendicular to the longitudinal direction where the longitudinally extending opening has a width narrower than a space part inside the groove on an inner side of the urethane pad of the seat cushion and the urethane pad of the seat back, and wherein large opening-size parts are provided spaced along the longitudinal direction of the longitudinally extending opening at the surface of the urethane pad covered with the seat cover, the large opening-size parts having a width larger than parts of the longitudinally extending opening not provided with the large opening-size parts.

12. The vehicle seat according to claim 11, wherein the urethane pad on both sides of the longitudinally extending opening of the groove formed in the urethane pad of the seat cushion and the seat back has a cross section where thickness is sequentially reduced toward the longitudinally extending opening.

13. The vehicle seat according to claim 11, wherein the large-opening size parts comprise semi-circular shaped openings provided spaced along the longitudinal direction of the longitudinally extending opening on both sides of the longitudinally extending opening.

14. The vehicle seat according to claim 11, wherein a diffusion layer formed of breathable flexible material is formed between the urethane pad of the seat cushion and the seat cover and between the urethane pad of the seat back and the seat cover.

15. The vehicle seat according to claim 11, wherein a plurality of grooves are formed, and the plurality of grooves are respectively linearly formed.

* * * * *